Feb. 17, 1931.    G. H. DAY ET AL    1,793,211
OPHTHALMIC MOUNTING
Filed April 11, 1928
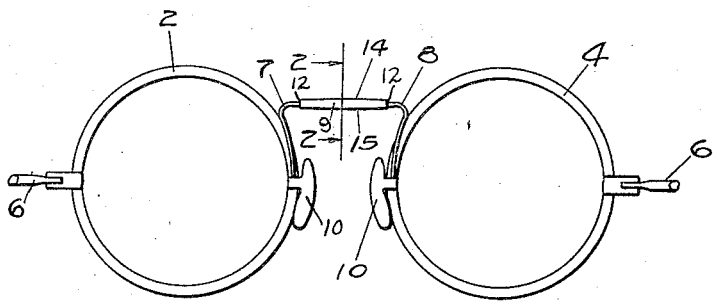
Fig. 1
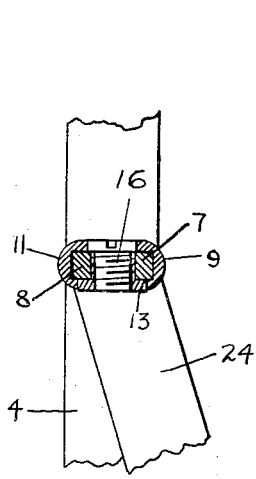
Fig. 2
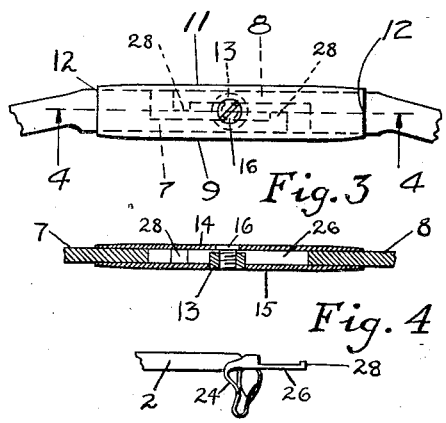
Fig. 3
Fig. 4
Fig. 5
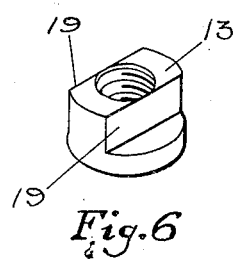
Fig. 6
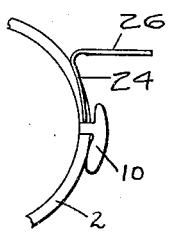
Fig. 7
INVENTORS
George H. Day
BY  Burton M. Tapner
*David Rines*
ATTORNEY Patented Feb. 17, 1931

1,793,211

UNITED STATES PATENT OFFICE

GEORGE H. DAY AND BURTON M. TAPNER, OF ROCHESTER, NEW YORK, ASSIGNORS TO BAUSCH & LOMB OPTICAL COMPANY, OF ROCHESTER, NEW YORK, A CORPORATION OF NEW YORK

OPHTHALMIC MOUNTING

Application filed April 11, 1928. Serial No. 269,226.

The present invention relates to ophthalmic mountings, and more particularly to mountings of the sliding-bar-bridge type. An object of the present invention is to simplify and improve ophthalmic mountings of the above-described character, to the end that the lens-holding rims shall hold firmly and with a uniform clamping action against the bar bridge. A further object is to provide, in a novel construction, a very wide range of adjustment, so that a single mounting shall be adjustable to the facial characteristics of any wearer. Another object is to provide an ophthalmic mounting of the said character that shall hold firmly and uniformly in any position of adjustment. Other and further objects will be explained hereinafter and will be particularly pointed out in the appended claims.

The invention will be more fully described in connection with the accompanying drawings, in which Fig. 1 is a rear elevation of an ophthalmic mounting constructed in accordance with a preferred embodiment of the present invention; Fig. 2 is an enlarged section taken upon the line 2—2 of Fig. 1, looking in the direction of the arrows; Fig. 3 is a similarly enlarged plan of a detail; Fig. 4 is a section taken upon the line 4—4 of Fig. 3, looking in the direction of the arrows; Fig. 5 is a fragmentary plan of one of the lens-holding rims, with a projection attached; Fig. 6 is a perspective view of a nut shown in section in Figs. 2 and 4; and Fig. 7 is an elevation corresponding to Fig. 5.

Ophthalmic mountings usually comprise two lens-holding members 2 and 4. In mountings of the spectacle type, the temples 6 are provided. The invention is, however, from some points of view, equally applicable to other mountings than spectacles. The lens-holding members 2 and 4 are shown as rims, but the invention may be embodied in mountings of the rimless type also, in which event rims 2 and 4 will be replaced by lens-holding clamps, as will be understood by persons skilled in the art. One of the rims is provided with a projection 7 rigid therewith and the other, similarly, with a projection 8. The rims are also each provided with a guard arm 10. In the case of rimless mountings, the projections 7 and 8 and the guards 10 may be carried by the lens-holding clamps.

According to the preferred embodiment of the invention that is illustrated in the accompanying drawings, the projections 7 and 8 extend into a flattened tube through opposite ends 12 of the tube. The projection 7 extends into the tube along a side 9 of the tube and the projection 8 along the opposite side 11. As the projections 7 and 8 are of less width than half the width of the tube, a space is provided between them, into which is inserted a nut 13. The nut 13 is inserted into the tube through an opening in a side 15 of the tube. A screw 16 extends through an opening in the opposite side 14. The nut 13 and the screw 16 are each provided with a head. The heads enter through the corresponding openings in the sides 14 and 15 of the tube and engage both projections 7 and 8, on opposite sides thereof, so that when the screw 16 is threaded tightly into the nut 13, the projections 7 and 8 become firmly clamped thereby. The openings in the sides 14 and 15 in which the heads of the screw 16 and the nut 13 are respectively seated prevent movement of the tube along the clamped-together projections 7 and 8. Furthermore, the heads of the nut and the screw are flush with the sides 14 and 15, being thus rendered inconspicuous.

To prevent turning of the nut 13 in its opening, it is cut flat along the sides 19 so that these sides may engage snugly against corresponding internally disposed flat sides of the projections 7 and 8. The head of the nut, however, is uncut. As the nut 13 can not turn, there is nothing to induce turning of the screw 16, no matter what the stresses and strains to which the mounting may become subjected, in use. By providing a separate nut 13, moreover, instead of screwing the screw 16 directly into a threaded portion of the tube, a greater threaded holding surface is provided.

The tube may, if desired, be integral with one of the projections 7, 8 but it is preferred to make it separate from both projections.

Each of the projections 7 and 8 comprises a first part 24 that extends forward, away from the wearer, as shown in Fig. 5, and a second part 26 that extends inward toward the other rim, in a direction substantially parallel to the plane of the rim and at a height considerably above the center of the rims 2 and 4. It is the part 26 that extends into the tube. This construction provides for adjustments for all pupillary distances, so that a single mounting may be adjusted to the pupillary distance and shape of forehead of any wearer. The projections are made sufficiently thick to permit of the necessary adjustments without breaking. The adjustment is of such nature, furthermore, as to permit tilting either lens out of the plane of the mounting.

The parts 26 of the projections 7 and 8 are each provided with a terminal L-shaped limit stop 28 for engaging against the nut 13 to prevent accidental withdrawal of the projections 7 and 8 from the tube during adjustments for pupillary distance.

When it is desired to adjust the bridge for pupillary distance, the screw 16 is slightly loosened, the projections 7 and 8 are pushed towards each other or pulled away from each other to the required pupillary distance, and the screw 16 is then retightened. The projections 7 and 8 can not be entirely withdrawn from the tube during such adjustment. To effect such result, it is necessary first to remove the screw 16 and the nut 13.

Modifications will obviously occur to persons skilled in the art, and all such are considered to be included within the spirit and scope of the invention, as defined in the appended claims.

What is claimed is:

1. An ophthalmic mounting comprising two lens-holding members each having a projection, a tube, the projections extending into the tube, a screw extending through an opening in the tube and having a head seated in the opening and engaging the projections, and means cooperating with the threads of the screw to hold the projections in the tube.

2. An ophthalmic mounting comprising two lens-holding members each having a projection, a tube, the projections extending into the tube through opposite ends of the tube, and two members extending through opposite sides of the tube and into engagement with the projections, the two members cooperating to hold the projections in the tube.

3. An ophthalmic mounting comprising two lens-holding members each having a projection, a tube, the projections extending into the tube through opposite ends of the tube along two opposite sides of the tube, and two members extending through two other opposite sides of the tube and in between the projections and into engagement with the projections, the two members cooperating to hold the projections in the tube.

4. An ophthalmic mounting comprising two lens-holding members each having a projection a first part of which extends forward and a second part of which extends inward substantially parallel to the plane of the rim, a tube, the second parts of the projections extending into the tube through opposite ends of the tube along two opposite sides of the tube, and two members extending into the tube from two other opposite sides of the tube and in between the projections, one of the members being a nut and the other member being a screw threaded into the nut, the screw and the nut each having a head engaging both projections to hold the projections in the tube.

5. An ophthalmic mounting comprising two lens-holding members each having a projection rigid therewith, a tube, the projections extending into the tube through opposite ends of the tube and adjustable within the tube, means for limiting the adjustment of the projections in the tube, and means for clamping the projections in adjusted position within the tube.

6. An ophthalmic mounting comprising two lens-holding members each having a projection rigid therewith, a tube, the projections extending into the tube through opposite ends of the tube and adjustable within the tube, means for clamping the projections in adjusted position within the tube, and means carried by the projections and cooperating with the clamping means to limit the adjustment of the projections in the tube.

7. An ophthalmic mounting comprising two lens-holding members each having a projection, a tube, the projections extending into the tube through opposite ends of the tube and adjustable within the tube, and two members extending into the tube from opposite sides of the tube and into engagement with the projections, the two members cooperating to hold the projections in the tube, and the projections having terminal L-shaped portions adapted to cooperate with the second-named members to limit the adjustment of the projections within the tube.

8. An ophthalmic mounting comprising two lens-holding members each having a projection, a tube, the projections extending into the tube through opposite ends of the tube along two opposite sides of the tube, and two members extending into the tube from two other opposite sides of the tube and in between the projections, the members each having a head engaging both projections to hold the projections in the tube.

9. An ophthalmic mounting comprising two lens-holding members each having a projection, a tube, the projections extending into the tube through opposite ends of the tube along two opposite sides of the tube, the projections being of less width than half the width of the tube, whereby a space is provided between the projections, and two members extending into the space between the projections from two other opposite sides of the tube and into engagement with the projections, the two members cooperating to hold the projections in the tube.

10. An ophthalmic mounting comprising two lens-holding members each having a projection, a tube, the projections extending into the tube through opposite ends of the tube along two opposite sides of the tube, the projections being of less width than half the width of the tube, whereby a space is provided between the projections, and two members extending into the space between the projections from two other opposite sides of the tube and into engagement with the projections, the two members cooperating to hold the projections in the tube, one of the members being a nut and the other member being a screw threaded into the nut.

11. An ophthalmic mounting comprising two lens-holding members each having a projection, a tube, the projections extending into the tube through opposite ends of the tube along two opposite sides of the tube, the projections being of less width than half the width of the tube, whereby a space is provided between the projections, and two members extending into the space between the projections from two other opposite sides of the tube and in between the projections, one of the members being a nut and the other member being a screw threaded into the nut, the screw and the nut each having a head engaging both projections to hold the projections in the tube, the portion of the nut that extends into the space between the projections being flattened to engage against the projections to prevent rotation of the nut.

12. An ophthalmic mounting comprising two lens-holding members each having a projection, a tube, the projections extending into the tube through opposite ends of the tube, and two headed members extending through opposite sides of the tube, the said sides of the tube having openings in which the heads of the members are seated in clamping engagement with the projections to hold the projections in the tube.

13. An ophthalmic mounting comprising two lens-holding members each having a projection, a flattened tube, the projections extending into the tube through opposite ends of the tube along the two opposite narrow sides of the tube, and two headed members extending into the tube from the two opposite wide sides of the tube, the wide sides of the tube having openings in which the heads of the members are seated in clamping engagement with the projections to hold the projections in the tube.

In testimony whereof, we have hereunto subscribed our names this 9th day of April, 1928.
GEORGE H. DAY.
BURTON M. TAPNER.